Nov. 1, 1932.                W. LUCIUS                    1,885,526
                     SIGNAL SWITCH FOR MOTOR CARS
                      Filed Nov. 11, 1930        2 Sheets-Sheet 1
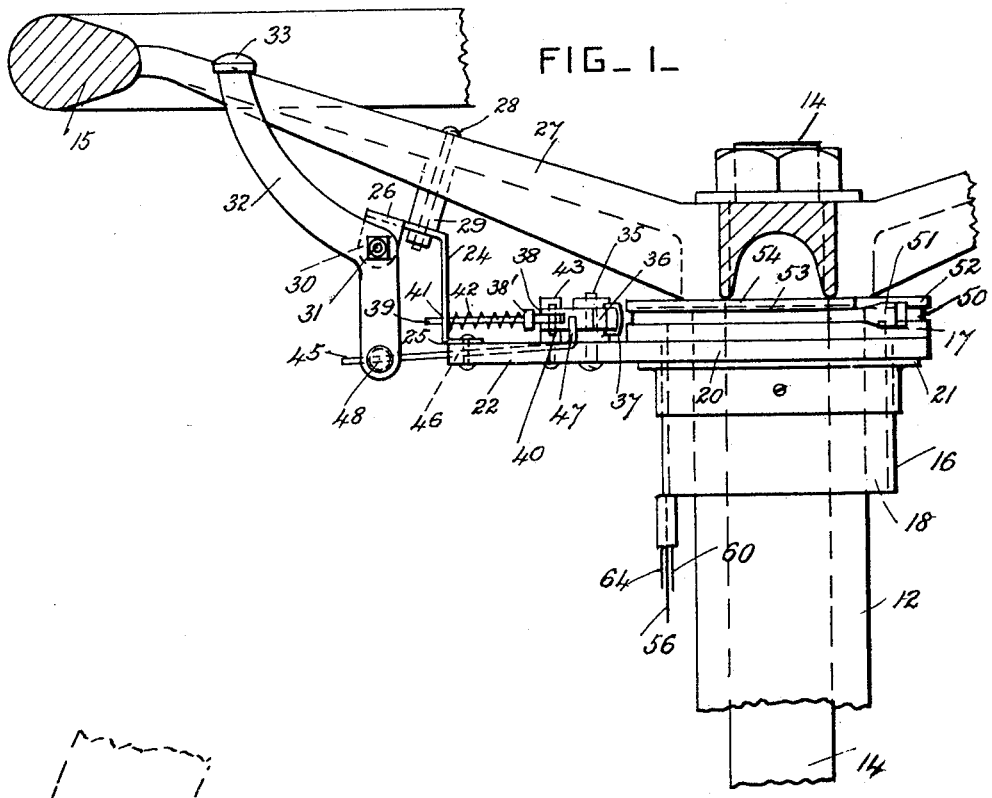
Inventor,
William Lucius
by Herbert W. Jenner.
Attorney.

Nov. 1, 1932.  W. LUCIUS  1,885,526
SIGNAL SWITCH FOR MOTOR CARS
Filed Nov. 11, 1930  2 Sheets-Sheet 2
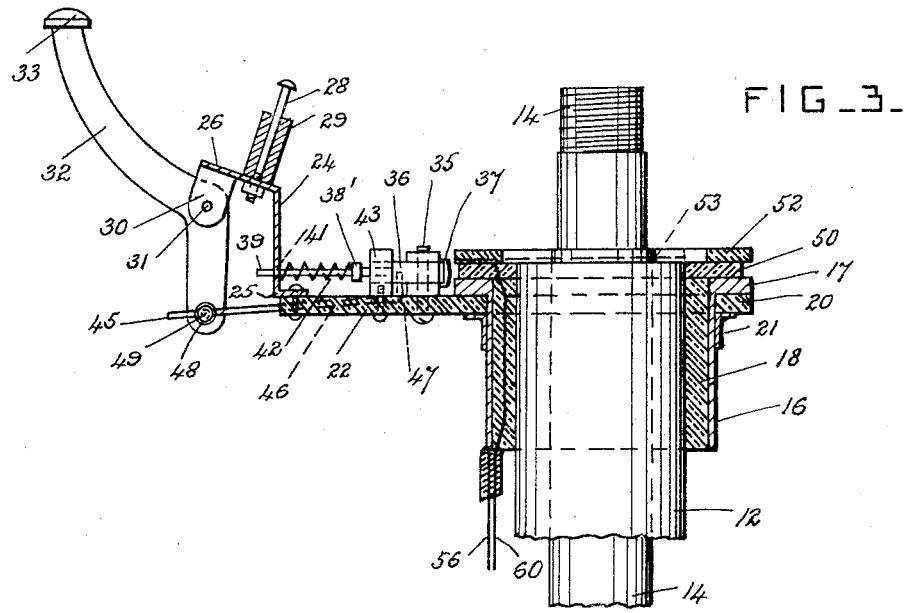
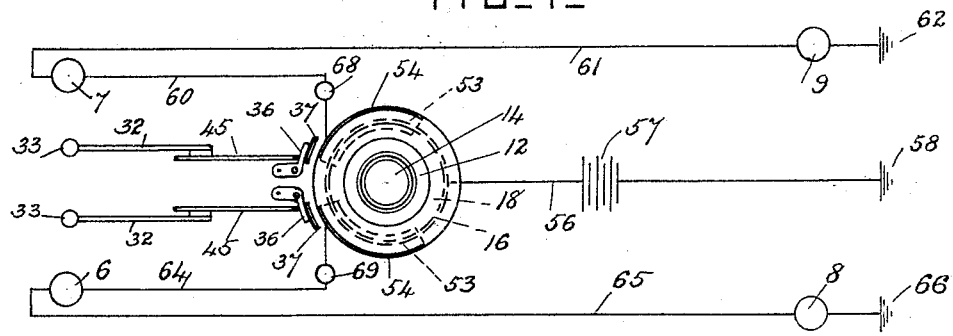
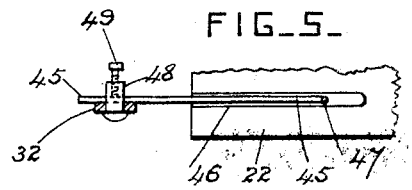
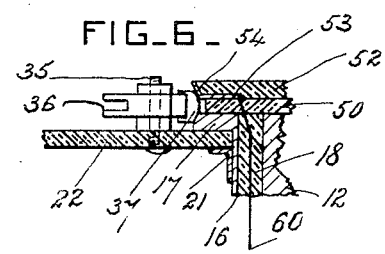
Inventor
William Lucius,
by Herbert W. Jenner
Attorney Patented Nov. 1, 1932

1,885,526

UNITED STATES PATENT OFFICE

WILLIAM LUCIUS, OF GAINESVILLE, FLORIDA

SIGNAL SWITCH FOR MOTOR CARS

Application filed November 11, 1930. Serial No. 494,970.

This invention relates to electric switches for energizing signal lights for vehicles, such as motor cars, to indicate the direction of an intended turn to the right or left, and also to indicate a stop, and to provide a tail light. This invention consists in the novel construction and combination of the parts hereinafter fully described and claimed, whereby the lights are placed in an electric circuit by means of finger switch levers arranged adjacent to the steering hand wheel and moving circumferentially with it, and whereby the lights are switched off automatically when the steering hand wheel has been rotated to a predetermined extent in either direction.

In the drawings, Fig. 1 is a side view of portions of a hand steering wheel and a steering column provided with switch mechanism according to this invention. Fig. 2 is a plan view of the same with the steering wheel removed. Fig. 3 is a vertical section through the switch mechanism, taken on the line 3—3 in Fig. 2. Fig. 4 is a diagram of the switch mechanism and the lights at the front and rear ends of the vehicle, and the pilot lights, showing the electric circuits. Fig. 5 is a detail plan view of one of the rods 45 and pins 48. Fig. 6 is a detail side view of one of the contact levers 36 showing the circuit closed.

The vehicle or motor car is of any approved construction, and is preferably provided at its front end with a green light 6 on its left hand side, and a red light 7 at its right hand side to indicate the direction of turn. It has also at its rear end a yellow tail light, 8, and a red stop light 9. Lights of any other color can however be used, and the lights may be used to illuminate signal words or pointers if desired.

The steering wheel post 14 has a steering column 12 journaled on it, and a steering hand wheel 15 is secured on the upper part of the steering post. These parts are of any approved construction, and the steering post may be arranged at any desired angle. In carrying out this invention a sleeve 16 is secured on the steering column 12, and is provided with a metal contact member or flange 17 at its top which projects outwardly. The sleeve and its flange are insulated from the steering column 12 by insulating material 18.

A support or ring 20 is journaled on the sleeve 16 below the flange 17, and is supported by a flanged ring 21 secured to the sleeve below the ring 20. This support or ring 20 is formed of insulating material, and it has an arm 22 which projects radially at one side of it. An auxiliary support or plate 24 is secured by a flange 25 to the free end portion of the arm 22 and projects upwardly, and this plate has a flange 26 at its top which is secured to one arm 27 of the steering wheel by a bolt 28 and distance piece 29, so that the support or ring 20 is rotated with the hand wheel. The flange 26 of the plate 24 has a downwardly projecting lug 30 at each end in which a pivot pin 31 is supported.

Bell-crank finger levers 32 project upwardly and are pivoted on the end portions of the pin 31, and have finger buttons 33 at their top ends, which project one on each side of the arm 27 of the steering wheel adjacent to its rim, where they can be depressed with facility by the person driving the motor car.

Two pins 35 project upwardly from the insulated arm 22, and contact levers 36 are pivoted on the pins 35. These contact levers project in opposite directions, and they have insulated contact pieces 37 secured to their free end portions. These contact pieces are of any approved shape and material, and they preferably have curved contact faces.

The contact levers have lugs 38 arranged adjacent to their pivots, and 39 are pins which are connected at one end to the lugs 38 by pivot pins 40. The other end portions of the pins 39 are slidable in guide holes 41 in the vertical support or plate 24, and 42 are helical springs which encircle the pins 39. The springs 42 are arranged between the plate 24 and collars 38', and they normally hold the lugs pressed against a stop 43 which projects upwardly from the insulated arm 22, between the lugs of the two contact levers.

Rods 45 are arranged to slide longitudinally in guide grooves 46 in the arm 22 below the flange 25 of the vertical plate 24, and at one end these rods have projections 47 which are free to bear against the backs of the two contact levers. The other end portions of the rods 45 are connected with the lower end portions of the finger levers 32 by pins 48. The pins 48 are pivoted in the end portions of the levers, and the rods are secured in cross holes in the pins 48 by screws 49. These screws 49 hold the rods connected to the pins 48, and permit the length of the rods to be adjusted.

A ring 50 of insulating material is secured to the upper side of the metal contact flange 17, and has two lugs 51 which project from its periphery at predetermined points, and one upon each side of the axis of the steering wheel. A second ring or plate 52 of insulating material is secured above the ring 50, and 53 are metal contact plates secured between the rings 50 and 52, and provided with curved contact flanges 54 which project upwardly around portions of the periphery of the upper ring 52. The contact flanges are of any suitable length, and are secured in prearranged positions, and one at each side of the axis of the steering wheel.

A conductor 56 is connected to the sleeve 16 of the main insulated contact member or flange 17, and receives electricity from one pole of any approved battery 57, the opposite pole of which is grounded at 58. The two insulated contact flanges or branch contact members 54 have separate conductors 60 and 64 secured to them. One conductor 60 extends from one insulated contact member to the right hand light at the front end of the car, and a continuation 61 of the conductor 60 extends from the said right hand light to the stop light 9 at the rear end of the car, and thence to ground at 62.

The other conductor 64 extends from the other insulated branch contact member to the left hand light at the front end of the car, and a continuation 65 of the conductor 64 extends from the said left hand light to the tail light 8 at the rear end of the car, and thence to ground at 66.

Two pilot or auxiliary lights 68 and 69 are preferably included in the branch conductors 60 and 64 respectively, and are arranged in any position on the car where they can readily be seen by the person driving it. These pilot lights indicate whether the front and rear lights to which they pertain are in proper working order, and they are preferably of the same color as the direction lights to which they pertain.

When a driver intends to make a turn he depresses the button of the appropriate finger lever, and thereby presses one of the contact pieces 37 onto the contact flange 17 and one of the contact flanges 54. Current from the battery then passes through the two contact flanges 17 and 54 and the contact piece 37, and the appropriate signal lights at the ends of the car are energized.

When the driver has rotated the steering wheel sufficiently to make the intended turn the movement of the steering wheel causes the pivoted contact piece which has completed the electric circuit to strike one of the insulated lugs 51, which presses the contact piece away from the contact flanges, and breaks the circuit. The springs 42 of the contact levers are arranged to hold them and the contact pieces in two positions independently of the finger levers. The springs 42 normally hold the contact levers against the stop, but when one button is depressed so as to move the contact lever sufficiently, the spring also operates to hold the contact piece pressed against the two contact flanges until the contact piece is forced back by engagement with one of the lugs 51, and the signal lights are thereby extinguished automatically. This signal mechanism can be added to existing motor cars with facility, and it can also advantageously be built into motor cars in course of construction.

What I claim is:

1. In an electric switch for a motor vehicle, a vehicle steering post and a steering wheel supported by the post, a steering column, an insulated sleeve secured on the steering column and provided with a contact flange, a stationary contact member supported by the said column and insulated from the said contact flange, an insulated support mounted on the said sleeve and rotating with the steering wheel, a movable contact member carried by the said support, and means arranged adjacent to the hand steering wheel and mounted on the said support and adapted to operate the movable contact member to close a circuit from the said sleeve to the said stationary contact member.

2. A vehicle signal as set forth in claim 1, and having a stationary insulating ring arranged between the said contact flange and stationary contact member and provided with a projecting lug which automatically retracts the movable contact member to break the circuit when the steering wheel has been rotated to a predetermined extent.

3. A vehicle signal as set forth in claim 1, the said movable contact member being pivoted to the said support, and the said means for operating it comprising a bell-crank finger lever pivoted to the said support and provided with a push rod for bearing on the movable contact member.

4. A vehicle signal as set forth in claim 1, the said movable contact member being pivoted to the said support and provided with a lug adjacent to its pivot, a stop lug on the said support, a spring which normally presses the said lug against the stop lug and operates to hold the pivoted contact member out of contact with the said contact flange and stationary contact member, and the said means for operating the movable contact member comprising a bell-crank finger lever pivoted to the said support and provided with a push rod for bearing on the movable contact member.

5. In an electric switch for a motor vehicle, a vehicle steering post and a steering wheel supported by the post, a steering column, insulated contact members secured to the steering column, an insulated support mounted on the steering column and provided with a projecting arm and means for securing the arm to the steering wheel so that the arm and support rotate with the steering wheel, a contact member pivoted to the said arm and operating to close an electric circuit through the said contact members, and a manually-operated switch lever pivoted to the said support and operatively connected with the pivoted switch member.

6. A vehicle signal as set forth in claim 5, the said pivoted contact member being provided with a spring device which automatically holds it in its open and closed positions independently of the operation of the switch lever.

7. In an electric switch for a motor vehicle, a vehicle steering post, a column surrounding said post and a steering wheel supported by the post, a main insulated contact member secured to the steering column, two segmental insulated contact members also secured to the steering column and arranged one on each side of its axis, a support of insulating material journaled on the steering column and projecting at one side thereof, said support connected with the steering wheel so as to rotate therewith, and two contact members mounted on the support and provided with manually operated levers, each contact member adapted to electrically connect the main contact member with one of the segmental contact members.

In testimony whereof I affix my signature.

WILLIAM LUCIUS.